United States Patent
Kravtsov et al.

(10) Patent No.: US 11,822,672 B1
(45) Date of Patent: Nov. 21, 2023

(54) SYSTEMS AND METHODS FOR SCANNING IMAGES FOR VULNERABILITIES

(71) Applicant: Cisco Technology, Inc., San Jose, CA (US)

(72) Inventors: Alexei Kravtsov, Petah Tikva (IL); Idan Frimark, Tzora (IL); Erez Fishhimer, Tel-Aviv (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 222 days.

(21) Appl. No.: 17/335,937

(22) Filed: Jun. 1, 2021

Related U.S. Application Data

(60) Provisional application No. 63/145,610, filed on Feb. 4, 2021.

(51) Int. Cl.
| | |
|---|---|
| *G06F 21/57* | (2013.01) |
| *G06F 21/56* | (2013.01) |
| *G06F 21/55* | (2013.01) |
| *G06F 21/53* | (2013.01) |
| *H04L 9/40* | (2022.01) |

(52) U.S. Cl.
CPC ............ *G06F 21/577* (2013.01); *G06F 21/53* (2013.01); *G06F 21/554* (2013.01); *G06F 21/566* (2013.01); *H04L 63/1433* (2013.01)

(58) Field of Classification Search
CPC ...... G06F 21/577; G06F 21/53; G06F 21/554; G06F 21/566; H04L 63/1433
See application file for complete search history.

(56) References Cited

U.S. PATENT DOCUMENTS

| | | | |
|---|---|---|---|
| 11,070,580 B1* | 7/2021 | Wang | H04L 63/0281 |
| 2008/0092237 A1 | 4/2008 | Yoon et al. | |
| 2011/0277034 A1* | 11/2011 | Hanson | G06F 21/554 |
| | | | 709/224 |
| 2020/0097662 A1* | 3/2020 | Hufsmith | H04L 9/0643 |

(Continued)

FOREIGN PATENT DOCUMENTS

CN 110276199 A 9/2019

OTHER PUBLICATIONS

Portshift, "Kubei, An Open-Source Kubernetes Runtime Vulnerability Scanner," https://www.portshift.io/runtime-kubernetes-scanning-kubei/, Feb. 23, 2021, 3 pages.

(Continued)

*Primary Examiner* — Christopher A Revak
(74) *Attorney, Agent, or Firm* — Baker Botts L.L.P.

(57) ABSTRACT

In one embodiment, a method includes extracting, by a vulnerability scanning tool, a plurality of images from one or more pods running within a cluster. The method also includes determining, by the vulnerability scanning tool, a plurality of unique images from the plurality of images, scanning, by the vulnerability scanning tool, the plurality of unique images in parallel, and detecting, by the vulnerability scanning tool, one or more vulnerabilities within the plurality of unique images in response to scanning the plurality of unique images in parallel. The method further includes determining, by the vulnerability scanning tool, a vulnerability level associated with a pod of the one or more pods and assigning, by the vulnerability scanning tool, the vulnerability level to the pod.

20 Claims, 4 Drawing Sheets

(56) References Cited

U.S. PATENT DOCUMENTS

| | | | |
|---|---|---|---|
| 2020/0314015 A1 | 10/2020 | Mariappan et al. | |
| 2020/0412540 A1* | 12/2020 | Sabath | H04L 9/0866 |
| 2021/0157623 A1* | 5/2021 | Chandrashekar | G06F 9/5072 |
| 2022/0019455 A1* | 1/2022 | Cao | G06F 9/45545 |

OTHER PUBLICATIONS

Soares, R., "Scanning Containers for Vulnerabilities on Kubernetes Clusters," Cern Openlab, Aug. 2018 14 pages.

\* cited by examiner

Scan report 160

| Total Vulnerabilities 1964 218 | | Total Defcon 1 0 210 220 | | Total Critical 32 212 224 226 | | Total High 201 214 228 | | 216 230 |
|---|---|---|---|---|---|---|---|---|
| POD NAME | CONTAINER NAME | NAMESPACE | NAME | SEVERITY | IMAGE NAME | | | FOUND IN |
| details-v1-678fb865d6-h4q5k | details | default | CVE-2019-3462 | Critical | istio/examples-bookinfo-details-v1:1.9.0 | | | 1.4.8 |
| details-v1-678fb865d6-h4q5k | details | default | CVE-2019-14896 | Critical | istio/examples-bookinfo-details-v1:1.9.0 | | | 4.9.110-1 |
| details-v1-678fb865d6-h4q5k | details | default | CVE-2019-19814 | Critical | istio/examples-bookinfo-details-v1:1.9.0 | | | 4.9.110-1 |
| details-v1-678fb865d6-h4q5k | details | default | CVE-2019-19813 | Critical | istio/examples-bookinfo-details-v1:1.9.0 | | | 4.9.110-1 |
| details-v1-678fb865d6-h4q5k | details | default | CVE-2019-10220 | Critical | istio/examples-bookinfo-details-v1:1.9.0 | | | 4.9.110-1 |
| details-v1-678fb865d6-h4q5k | details | default | CVE-2019-15292 | Critical | istio/examples-bookinfo-details-v1:1.9.0 | | | 4.9.110-1 |
| details-v1-678fb865d6-h4q5k | details | default | CVE-2019-19816 | Critical | istio/examples-bookinfo-details-v1:1.9.0 | | | 4.9.110-1 |
| details-v1-678fb865d6-h4q5k | details | default | CVE-2019-15926 | Critical | istio/examples-bookinfo-details-v1:1.9.0 | | | 4.9.110-1 |
| details-v1-678fb865d6-h4q5k | details | default | CVE-2018-15686 | Critical | istio/examples-bookinfo-details-v1:1.9.0 | | | 232-25+deb9u4 |
| details-v1-678fb865d6-h4q5k | details | default | CVE-2017-16997 | Critical | istio/examples-bookinfo-details-v1:1.9.0 | | | 2.24-11+deb9u3 |
| details-v1-678fb865d6-h4q5k | details | default | CVE-2019-15505 | Critical | istio/examples-bookinfo-details-v1:1.9.0 | | | 4.9.110-1 |
| details-v1-678fb865d6-h4q5k | details | default | CVE-2019-14901 | Critical | istio/examples-bookinfo-details-v1:1.9.0 | | | 4.9.110-1 |
| details-v1-678fb865d6-h4q5k | details | default | CVE-2018-20836 | Critical | istio/examples-bookinfo-details-v1:1.9.0 | | | 4.9.110-1 |

FIG. 2

SYSTEMS AND METHODS FOR SCANNING IMAGES FOR VULNERABILITIES

CROSS-REFERENCE TO RELATED APPLICATIONS

This application claims benefit of U.S. Provisional Patent Application No. 63/145,610 filed Feb. 4, 2021 by Alexei Kravtsov et al, and entitled "RUNTIME IMAGE VULNERABILITY SCANNING IN A KUBERNETES CLUSTER," which is incorporated herein by reference as if reproduced in its entirety.

TECHNICAL FIELD

The present disclosure relates generally to communication networks, and more specifically to systems and methods for scanning images for vulnerabilities.

BACKGROUND

Network-based vulnerability scanners may be used to identify weaknesses within a network. Many tools are currently available for vulnerability scanning. All existing vulnerability scanning tools require some form of preliminary integration to provide visibility to the risk associated with deployed containers. The scanning process takes place either in continuous integration/continuous delivery (CI/CD) pipelines (which integrate the vulnerability scanners into the CI workflow) or in the images' registries prior to the containers' deployment phase.

BRIEF DESCRIPTION OF THE DRAWINGS

FIG. 2 illustrates an example scan report generated by a vulnerability scanning tool;

DESCRIPTION OF EXAMPLE EMBODIMENTS

OVERVIEW

Figure 1:
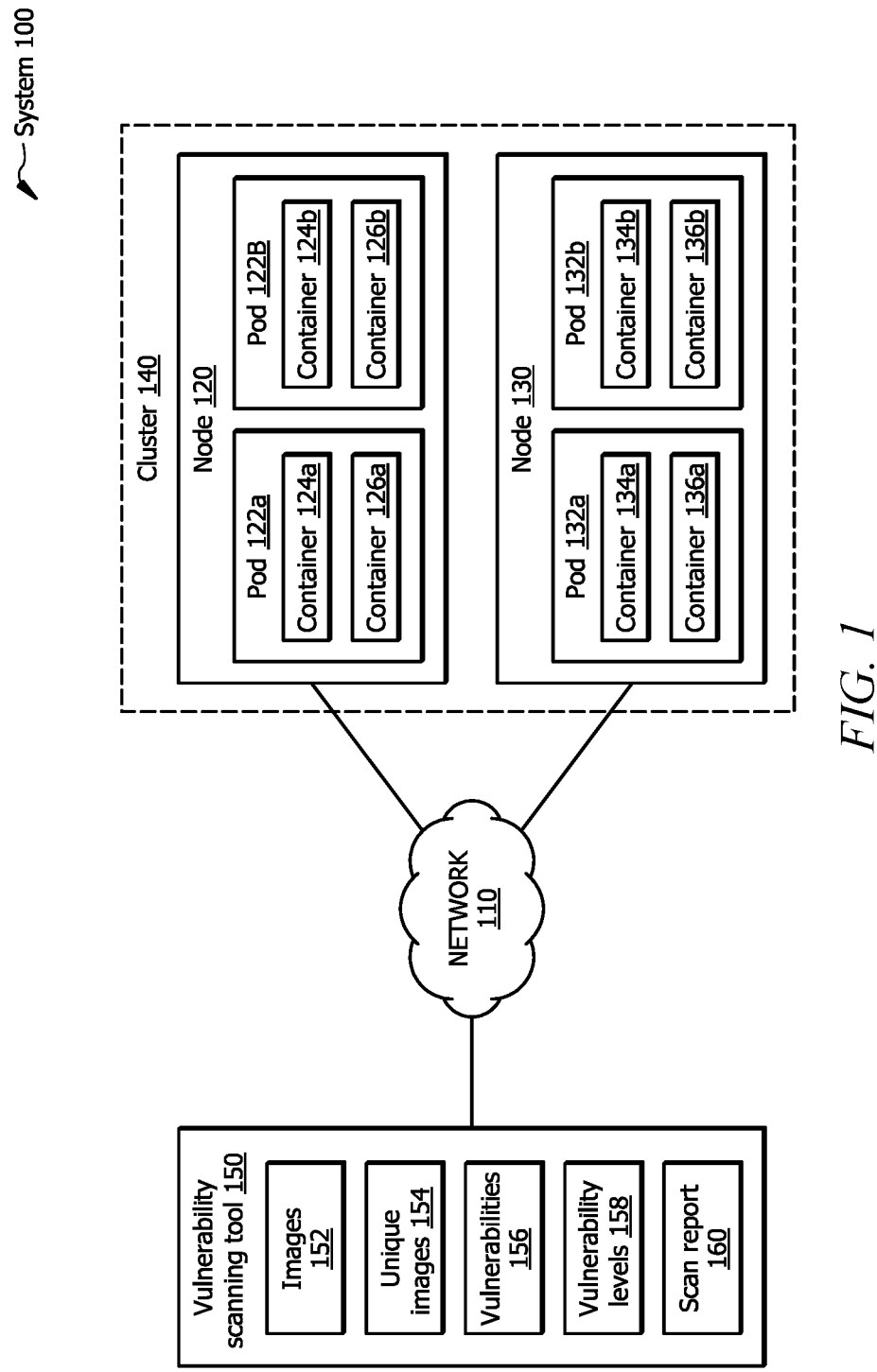
FIG. 1 illustrates an example system for scanning images for vulnerabilities.

According to an embodiment, a vulnerability scanning tool includes one or more processors and one or more computer-readable non-transitory storage media coupled to the one or more processors and including instructions that, when executed by the one or more processors, cause the vulnerability scanning tool to perform operations. The operations include extracting a plurality of images from one or more pods running within a cluster. The operations also include determining a plurality of unique images from the plurality of images, scanning the plurality of unique images in parallel, and detecting one or more vulnerabilities within the plurality of unique images in response to scanning the plurality of unique images in parallel. The operations further include determining a vulnerability level associated with a pod of the one or more pods and assigning the vulnerability level to the pod.

In certain embodiments, the operations include determining whether to apply a policy to the pod based at least in part on the vulnerability level of the pod. The policy may include one of the following: blocking the pod from running at a future point in time; and preventing communication by the pod to specific destinations within the cluster. The vulnerability level may be selected from one of the following vulnerability levels: critical; high; medium; and low. In certain embodiments, the operations include generating a scan report indicating the vulnerability level of the pod. Scanning the plurality of unique images in parallel may be performed in runtime.

In some embodiments, the operations include detecting a first vulnerability within a first unique image of the pod and classifying the first vulnerability within the first unique image of the pod as a high vulnerability level. The operations may also include detecting a second vulnerability within a second unique image of the pod and classifying the second vulnerability within the second unique image of the pod as a low vulnerability level. The operations may further include assigning the high vulnerability level to the pod.

In certain embodiments, the operations include determining a location of the pod and identifying one or more images within the pod that contain the vulnerabilities. In some embodiments, the operations include identifying one or more components within each of the one or more images within the pod that contain the vulnerabilities.

According to another embodiment, a method includes extracting, by a vulnerability scanning tool, a plurality of images from one or more pods running within a cluster. The method also includes determining, by the vulnerability scanning tool, a plurality of unique images from the plurality of images, scanning, by the vulnerability scanning tool, the plurality of unique images in parallel, and detecting, by the vulnerability scanning tool, one or more vulnerabilities within the plurality of unique images in response to scanning the plurality of unique images in parallel. The method further includes determining, by the vulnerability scanning tool, a vulnerability level associated with a pod of the one or more pods and assigning, by the vulnerability scanning tool, the vulnerability level to the pod.

According to yet another embodiment, one or more computer-readable non-transitory storage media embody instructions that, when executed by a processor, cause the processor to perform operations. The operations include extracting a plurality of images from one or more pods running within a cluster. The operations also include determining a plurality of unique images from the plurality of images, scanning the plurality of unique images in parallel, and detecting one or more vulnerabilities within the plurality of unique images in response to scanning the plurality of unique images in parallel. The operations further include determining a vulnerability level associated with a pod of the one or more pods and assigning the vulnerability level to the pod.

Technical advantages of certain embodiments of this disclosure may include one or more of the following. Certain embodiments include a vulnerability scanning tool that allows DevOps, DevSecOps, and/or security teams to accurately assess the risk of deployed containers within a network without the need for preliminary integrations in CI pipelines or image registries. In some embodiments, the vulnerability scanning tool provides real-time risk assessment of deployed pods (e.g., application pods and Kubernetes pods), providing full coverage even for elements which are not always scanned (e.g., public images not stored on the registry that were not created in the user CI workflow, the API server, or the Istio/service mesh control-plane). Once an image vulnerability is detected, the vulnerable pod may be terminated, which prevents the pod from starting and/or communicating according to the enforcement policies.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for scanning images for vulnerabilities. In certain embodiments, a vulnerability scanning tool scans images for vulnerabilities in runtime (i.e., while the pods and/or containers are running). As a result, a plurality of pods may run in a cluster, and one or more of the pods may be selected for scanning to determine vulnerabilities. The scanning does not require a restart of a pod. Once the scan is complete, the identity of a given pod may be updated to indicate the vulnerability level of the pod. One or more policies may then be applied based on the vulnerability level. The policies may include blocking the pod from running at a future point in time, preventing communication by the pod to specified destinations, or any other suitable policy. In certain embodiments, the policies are enforced in real-time.

FIG. 1 illustrates an example system 100 for scanning images for vulnerabilities. System 100 or portions thereof may be associated with an entity, which may include any entity, such as a business or company that scans images for vulnerabilities. The components of system 100 may include any suitable combination of hardware, firmware, and software. For example, the components of system 100 may use one or more elements of the computer system of FIG. 4. System 100 of FIG. 1 includes a network 110, nodes 120, pods 130, containers 132, cluster 140, and vulnerability scanning tool 150.

Network 110 of system 100 is any type of network that facilitates communication between components of system 100. Network 110 may connect one or more components of system 100. One or more portions of network 110 may include an ad-hoc network, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined WAN (SD-WAN), a metropolitan area network (MAN), a portion of the Internet, a portion of the Public Switched Telephone Network (PSTN), a cellular telephone network, a Digital Subscriber Line (DSL), a 3G/4G/5G network, a Long Term Evolution (LTE) network, a combination of two or more of these, or other suitable types of networks. Network 110 may include one or more different types of networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like.

Nodes 120 of system 100 are connection points within network 110 that receive, create, store and/or send data along a path. In certain embodiments, nodes 120 refer to Kubernetes nodes. Nodes 120 may include one or more redistribution points that recognize, process, and forward data to other nodes 120 of network 110. Nodes 120 may include physical and/or virtual nodes. For example, nodes 120 may include one or more virtual machines, bare metal servers, and the like. In certain embodiments, one or more nodes 120 include data communications equipment such as routers, servers, printers, workstations, switches, bridges, modems, hubs, and the like. Nodes 120 may include provider edge nodes, customer edge nodes, border nodes, etc. Nodes 120 may include one or more master nodes and/or one or more worker nodes. Master nodes 120 schedule activities, such as determining which pod 130 will run on which worker node 120, maintaining a desired state for one or more applications, scaling, rolling out new updates, or any other suitable activity. In certain embodiments, applications are deployed on worker nodes 120. In the illustrated embodiment of FIG. 1, nodes 120 include node 120a and node 120b.

Pods 130 of system 100 are deployable objects in network 110. In certain embodiments, pods 130 refer to Kubernetes pods. Each pod 130 may be a self-contained, isolated logical host that includes the systemic needs of the application it serves. Each pod 130 may run a single instance of an application within network 110. In certain embodiments, each pod 130 may be automatically assigned a unique Internet Protocol (IP) address. In some embodiments, one or more pods 130 may specify a set of shared storage volumes. In the illustrated embodiment of FIG. 1, pods 130 include pod 130a, pod 130b, pod 130c, and pod 130d. Node 120a of system 100 includes pod 130a and pod 130b. Node 120b of system 100 includes pod 130c and pod 130d.

Each pod 130 of system 100 includes one or more containers 132. Each container 132 is a standard unit of software that packages code and its dependencies, which allows an application to run quickly and reliably from one computing environment to another. Containers 132 assist in maintaining consistency across cloud platforms and microservices architectures. In the illustrated embodiment of FIG. 1, pod 130a includes container 132a and container 132b, pod 130b includes container 132c and container 132d, pod 130c includes container 132e and container 132f, and pod 130d includes container 132g and container 132h.

Cluster 140 of system 100 is a set of nodes 120 that run containerized applications. In certain embodiments, cluster 140 allows containers 132 to run across multiple machines and environments (e.g., virtual, physical, cloud-based, on-premises, etc.). In certain embodiments, cluster 140 is a group of master and worker nodes. For example, cluster 140 may include master node 130a and one or more worker nodes 130b.

In certain embodiments, containers 132 may communicate with other containers 132 within the same pod 130. For example, container 132a may communicate with container 132b of pod 130a, container 132c may communicate with container 132d of pod 130b, container 132e may communicate with container 132f of pod 130c, and/or container 132g may communicate with container 132h of pod 130d. Containers 132 in the same pod 130 may run on the same node 120 and share resources such as storage volumes and IP addressing. In certain embodiments, containers 132 may communicate with each other using the same localhost IP but different ports.

In certain embodiments, pods 130 may communicate with other pods 130 within the same cluster 140. Communication between pods 130 within the same cluster 140 may be accomplished using a dedicated pod IP address. For example, each node 130 in cluster 140 may be assigned a block of IP addresses such that every pod 130 within node 130 is allocated an IP address. Traffic between pods 130 may be routed using these IP addresses. The IP addresses of pods 130 are independent of the IP addresses of the nodes 120 and containers 132.

At any given time, each pod 130 may be in one of the following phases: pending, running, succeeded, failed, or unknown. During the pending phase, pod 130 has been created and accepted by cluster 140, but one or more of its containers 132 are not yet running. The pending phase includes time spent being scheduled on node 120 and downloading images 152. During the running phase, pod 130 has been bound to node 120, and all of its containers 132 have been created. At least one container 132 is running, is in the process of starting, or is restarting. During the succeeded phase, all containers 132 in pod 130 have terminated successfully. Terminated pods 130 do not restart. In the failed phase, all containers 132 in pod 130 have terminated, and at least one container 132 has terminated in failure. Container 132 "fails" if it exits with a non-zero status. In the unknown phase, the state of pod 130 cannot be determined.

Vulnerability scanning tool 150 of system 100 is a tool that scans images 152 for vulnerabilities 156. In certain embodiments, vulnerability scanning tool 150 scans images 152 to discover weaknesses of system 100. Vulnerability scanning tool 150 may use the discovered weaknesses to identify and detect vulnerabilities 156 arising from misconfigurations or flawed programming within a network-based asset such as a router, firewall, web server, application server, etc. In certain embodiments, vulnerability scanning tool 150 includes a software tool or application. In some embodiments, vulnerability scanning tool 150 includes one or more components from the computer system of FIG. 4.

In certain embodiments, each image 152 used by vulnerability scanning tool 150 is a binary that includes the requirements for running a single container 132. Each image 152 may include metadata describing the needs and/or capabilities of container 132. In certain embodiments, images 152 are used to create running pods 130. One or more images 152 may be stored in a registry. The registry includes a collection of one or more image repositories. Each image repository is a collection of related container images 152 and/or tags identifying images 152. Vulnerability scanning tool 150 may pull images 152 from the registries that were used to create pods 130.

In certain embodiments, vulnerability scanning tool 150 of system 100 extracts one or more images 152 from one or more pods 130 running within network 110. For example, vulnerability scanning tool 150 may retrieve image information from a first set of images 152 from pod 130a of node 120a. In some embodiments, vulnerability scanning tool 150 extracts a set of images 152 that were used to create running pods 130.

Vulnerability scanning tool 150 may scan one or more images 152 associated with one or more pods 130. For example, vulnerability scanning tool 150 may scan one or more images 152 extracted from one or more pods 130. In some embodiments, vulnerability scanning tool 150 scans images 152 in pods 130 after pods 130 are scheduled and until pods 130 are deleted. In certain embodiments, vulnerability scanning tool 150 scans images 152 during the "running" phase. Scanning images 152 during the "running" phase provides real-time risk assessment of deployed pods 130, which provides full coverage even for elements which are not always scanned (e.g., public images not stored on the registry that were not created in the user CI workflow, the API server, or the Istio/service mesh control-plane).

In some embodiments, vulnerability scanning tool 150 may determine whether the set of images 152 to be scanned includes one or more unique images 154. Unique images 154 are images 152 within the set that do not have a duplicate. If vulnerability scanning tool 150 determines that the set of images 152 includes unique images 154, vulnerability scanning tool 150 may identify unique images 154 from the set of images 152. To reduce the scanning workload of vulnerability scanning tool 150, vulnerability scanning tool 150 may only scan unique images 154 from the plurality of images 152.

In certain embodiments, vulnerability scanning tool 150 scans images 152 (e.g., unique images 154) in parallel. Vulnerability scanning tool 150 may be configured to set a number of parallel scans. In some embodiments, vulnerability scanning tool 150 may scan images 152 simultaneously using two or more parallel scanners. Vulnerability scanning tool 150 may be configured to identify specific namespaces to scan or ignore. Namespaces are used to organize clusters 140 into virtual sub-clusters. Any number of namespaces may be supported within cluster 140, each logically separated from others but with the ability to communicate with each other.

In some embodiments, vulnerability scanning tool 150 detects one or more vulnerabilities 156 within one or more images 154. For example, vulnerability scanning tool 150 may detect one or more vulnerabilities 156 within one or more images 152 in response to scanning one or more images 152. Vulnerabilities 156 are flaws or weaknesses in network 110. In certain embodiments, vulnerabilities 156 may allow attackers to access a memory of system 100, install malware, run code, and or modify, steal, or destroy sensitive data.

In certain embodiments, vulnerabilities 156 include one or more security vulnerabilities 156. For example, vulnerabilities 156 may include cybersecurity vulnerabilities identified by Common Vulnerabilities and Exposures (CVE). The CVE vulnerabilities may include one or more of the following: CVE-2019-19781 (Citrix Application Delivery Controller vulnerability); CVE-2018-7600 (Drupal remote code execution vulnerability); CVE-2015-1641 (Microsoft Office memory corruption vulnerability); CVE-2017-8759 (Microsoft .NET Framework Remote Code Execution Vulnerability); CVE-2018-4878 (Adobe Flash Player vulnerability); CVE-2017-0143 (SMB server vulnerability in older versions of Windows and Windows Server); CVE-2019-0604 (Remote code execution vulnerability in all modern versions of Sharepoin); CVE-2012-0158 (Microsoft Office vulnerability); CVE-2017-5638 (Apache Struts vulnerability); CVE-2017-0199 (Microsoft Office remote code execution); CVE-2017-11882 (Microsoft Office memory corruption vulnerability), and the like. In some embodiments, vulnerability scanning tool 150 detects one or more vulnerabilities 156 in response to scanning the plurality of unique images 154.

In certain embodiments, vulnerability scanning tool 150 determines one or more vulnerability levels 158 associated with one or more pods 130. Vulnerability levels 158 may include one or more of the following: critical, high, medium, and low. A critical vulnerability level 158 may indicate the potential for intruders to gain control of the host and/or a potential leakage of highly sensitive information. A high vulnerability level 158 may indicate the potential for intruders to gain access to specific information stored on the host such as security settings. A medium vulnerability level 158 may indicate the potential for intruders to collect sensitive information from the host such as the precise version of software installed. A low vulnerability level 158 may indicate the potential for intruders to collect information about the host such as information pertaining to open ports, services, etc.

In some embodiments, vulnerability scanning tool 150 assigns one or more vulnerability levels 158 to one or more pods 130. For example, vulnerability scanning tool 150 may detect a first vulnerability 158 within a first unique image 154 of container 132*a* of pod 130*a* and classify first vulnerability 158 within first unique image 154 of pod 130*a* as a high vulnerability level 158. Vulnerability scanning tool 150 may detect a second vulnerability 158 within a second unique image 154 of pod 130*a* and classify second vulnerability 158 within second unique image 154 of pod 130*a* as a low vulnerability level 158. In response to determining the high and low vulnerability levels 158 associated with pod 130*a*, vulnerability scanning tool 150 may assign the highest vulnerability level 158 (the high vulnerability level) to pod 130*a*.

In some embodiments, vulnerability scanning tool 150 determines whether to apply one or more policies 160 to one or more pods 130 based at least in part on one or more vulnerability levels 158. Policies 160 are a collection of rules that govern the behaviors of one or more components (e.g., nodes 120, pods 130, containers 132, and cluster 140) of network 110. In certain embodiments, one or more policies 160 restrict network traffic in cluster 140. Policies 160 may include killing one or more pods 130, blocking one or more pods 130 from running at a future point in time, preventing communication by one or more pods 130 to specific destinations, and the like.

In certain embodiments, vulnerability scanning tool 150 applies one or more policies 160 to one or more pods 130 in response to one or more vulnerability levels 158 exceeding a predetermined threshold. For example, if vulnerability level 158 (e.g., a critical vulnerability level) assigned to pod 130*a* exceeds a predetermined threshold (e.g., a high vulnerability level), vulnerability scanning tool 150 may apply policy 160 to pod 130*a* such that pod 130*a* is blocked from running at a future point in time. As another example, if vulnerability level 158 (e.g., a high vulnerability level) assigned to pod 130*b* exceeds a predetermined threshold (e.g., a medium vulnerability level), vulnerability scanning tool 150 may apply policy 160 to pod 130*b* such that pod 130*b* prevented from communicating with pod 130*a*.

In certain embodiments, vulnerability scanning tool 150 generates a scan report 162. Scan report 162 may indicate one or more vulnerabilities 156 and/or one or more vulnerability levels 158 associated with one or more pods 130. In certain embodiments, scan report 162 indicates the location of pods 130 that create the risk, images 152 that pods 130 were built from, and the specific components in images 152 that contain vulnerabilities 156. Scan report 162 is described in more detail in FIG. 2.

In certain embodiments, vulnerability scanning tool 150 determines a location of one or more pods 130 within network 110. For example, vulnerability scanning tool 150 may determine that pod 130*a* is located within node 120*a* of cluster 140. As another example, vulnerability scanning tool 150 may determine that pod 130*d* is located within node 120*b* of cluster 140. In some embodiments, vulnerability scanning tool 150 identifies one or more images 152 within pod 130 that contains one or more vulnerabilities 156. For example, vulnerability scanning tool may identify ten images 152 containing vulnerabilities 156 that were used to create running pod 130*a*. In certain embodiments, vulnerability scanning tool 150 identifies one or more components (e.g., metadata) within each image 152 of pod 130 that contain vulnerabilities 156.

Although FIG. 1 illustrates a particular number of networks 110, nodes 120, pods 130, containers 132, cluster 140, and vulnerability scanning tools 150, this disclosure contemplates any suitable number of networks 110, nodes 120, pods 130, containers 132, cluster 140, and vulnerability scanning tools 150. For example, system 100 may include more than one network 110, one cluster 140, and one vulnerability scanning tool 150. As another example, system 100 may include more or less than two nodes 120, four pods 130, and eight containers 132.

Although FIG. 1 illustrates a particular arrangement of network 110, nodes 120, pods 130, containers 132, cluster 140, and vulnerability scanning tool 150, this disclosure contemplates any suitable arrangement of network 110, nodes 120, pods 130, containers 132, cluster 140, and vulnerability scanning tool 150. For example, node 120*a* and node 120*b* may be a single node 120. As another example, node 120*a* and node 120*b* may be associated with different clusters 140. Furthermore, although FIG. 1 describes and illustrates particular components, devices, or systems carrying out particular actions, this disclosure contemplates any suitable combination of any suitable components, devices, or systems carrying out any suitable actions. For example, a network controller may perform one or more actions of vulnerability scanning tool 150.

FIG. 2 illustrates an example scan report 162 generated by vulnerability scanning tool 150 of FIG. 1. As illustrated in FIG. 2, scan report 162 includes the following four headings: a total number of vulnerabilities 210, a total number of defense readiness condition (Defcon) vulnerabilities 212, a total number of critical vulnerabilities 214, and a total number of high vulnerabilities 216. Total number of vulnerabilities 210 represents the total number of vulnerabilities detected during a scan session. For example, referring to system 100 of FIG. 1, vulnerability scanning tool 150 may scan a set of images 152 and detect a number of vulnerabilities 156 in response to scanning the set of images 152. Total number of vulnerabilities 210 represents this detected number of vulnerabilities 156. Total number of Defcon vulnerabilities 212 represents the total number of vulnerabilities detected during a scan session that are associated with the Defcon system.

The total number of critical vulnerabilities 214 represents the total number of vulnerabilities detected during a scan session that have been classified as having a critical vulnerability level. For example, referring to system 100 of FIG. 1, vulnerability scanning tool 150 may classify the detected vulnerabilities 156 as having a critical, high, medium, or low vulnerability level 158. Total number of critical vulnerabilities 210 represents this number of "critical" classified vulnerabilities 156. The total number of high vulnerabilities 216 represents the total number of vulnerabilities detected during a scan session that have been classified as having a high vulnerability level. For example, referring to system 100 of FIG. 1, vulnerability scanning tool 150 may classify the detected vulnerabilities 156 as having a critical, high, medium, or low vulnerability level 158. Total number of critical vulnerabilities 210 represents this number of "high" classified vulnerabilities 156. In the illustrated embodiment of FIG. 2, the total number of vulnerabilities 210 equals 1964, the total number of Defcon1 vulnerabilities 212 equals 0, the total number of critical vulnerabilities 214 equals 32, and the total number of high vulnerabilities 216 equals 201.

In certain embodiments, scan report 162 includes information associated with each of the detected vulnerabilities. In the illustrated embodiment of FIG. 2, scan report 162 represents the information associated with each of the detected vulnerabilities in a table format. The table includes the following rows: pod name 218, container name 220, namespace 222, name 224, severity 226, image name 228, and location where the vulnerability was found (found in) 230.

Pod name 218 of scan report 162 represents a name associated with a particular pod (e.g., pod 130*a* of FIG. 1). In certain embodiments, when a pod deployment is created, pod name 218 (e.g., "details-v1") may be assigned to the pod. In certain embodiments, a random string (e.g., 678fb865d6-4q5k) may be added to pod name 218. In the illustrated embodiment of FIG. 2, pod name 218 is represented as "details-v1-678fb865d6-4q5k" for each of the vulnerabilities shown in the rows of the table.

Container name 220 of scan report 162 represents the name of the scanned containers (e.g., container 132*a* of FIG. 1). In the illustrated embodiment of FIG. 1, container name 220 is represented as "details" for each of the vulnerabilities shown in the rows of the table. Namespace 222 of scan report 162 represents objects used to partition a cluster into multiple virtual clusters. In the illustrated embodiment of FIG. 1, namespace 222 is represented as "default" for each of the vulnerabilities shown in the rows of the table. The default namespace is used for objects with no other namespace. In certain embodiments, 'default' is the namespace that is referenced by default for every command, and/or where every resource is located by default. Until new namespaces are created, an entire cluster may reside in 'default'.

Name 224 of scan report 162 represents the name of the identified vulnerability (e.g., vulnerability 156 of FIG. 1). In the illustrated embodiment of FIG. 2, name 224 is represented as "CVE-2019-3462" for the first vulnerability shown in the first row of the table. Name 224 may represent a CVE identification. For example, CVE-2019-3462 may represent an incorrect sanitation of the 402 redirect field in HTTP transport method of apt versions 1.4.8 and earlier, as described by CVE. As another example, CVE-2019-3462 (shown in row 2 of the table of scan report 162 of FIG. 2) may represent a heap-based buffer overflow vulnerability found in the Linux kernel, version kernel-2.6.32, in Marvell WiFi chip driver, as described by CVE.

Severity 226 of scan report 162 represents the vulnerability level (e.g., vulnerability level 158 of FIG. 1) of the identified vulnerability. Severity 226 may be identified as critical, high, medium, low, or any other suitable vulnerability level. In the illustrated embodiment of FIG. 2, severity 226 is represented as "critical" for each of the vulnerabilities shown in the table. In certain embodiments, critical is the highest vulnerability level that may be assigned to a vulnerability.

Image name 228 of scan report 162 represents the name of the image (e.g., image 152 of FIG. 1) identified as having the associated vulnerability. In the illustrated embodiment of FIG. 2, image name 228 is represented as "istio/examples-bookinfo-details-v1:1.9.0" for the vulnerability shown on the first row of the table. Found in 230 of scan report 162 represents the location where the associated vulnerability was found. In the illustrated embodiment of FIG. 2, found in 230 is represented as "1.4.8" for the vulnerability shown on the first row of the table.

Although this disclosure describes and illustrates a particular format of scan report 162, this disclosure contemplates any suitable format of scan report 162. For example, scan report 162 may display information as a graph and/or a chart format. Although this disclosure describes and illustrates particular information included in scan report 162, this disclosure contemplates any suitable information to be included in scan report 162. For example, scan report 162 may include more or less than seven columns of information. As another example, scan report 162 may include a description of vulnerability name 224. Furthermore, although this disclosure describes and illustrates particular components, devices, or systems carrying out particular actions, this disclosure contemplates any suitable combination of any suitable components, devices, or systems carrying out any suitable actions.

Figure 3:
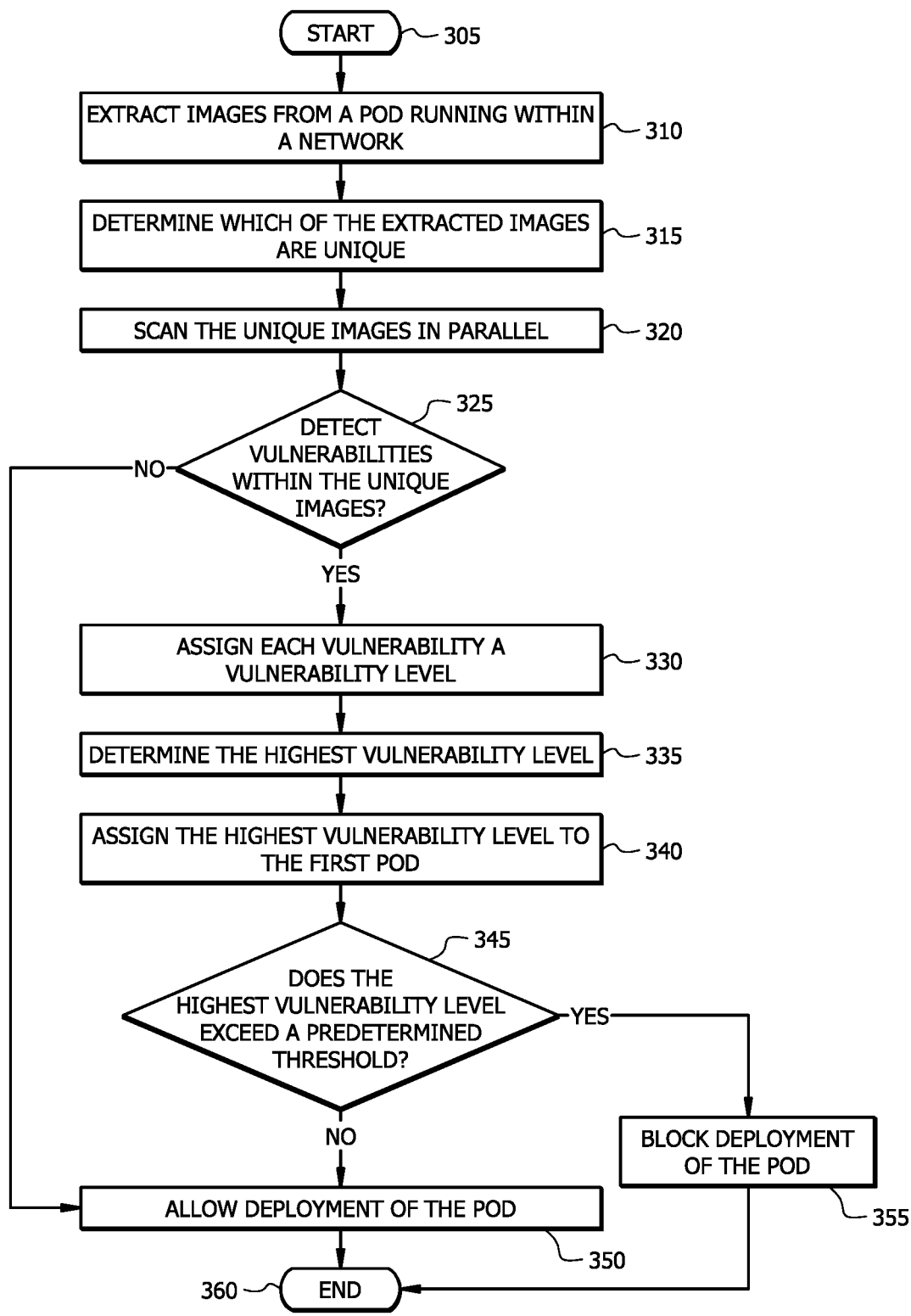
FIG. 3 illustrates an example method for scanning images for vulnerabilities.

FIG. 3 illustrates an example method 300 for scanning images for vulnerabilities. Method 300 begins at step 305. At step 310, a network component (e.g., vulnerability scanning tool 150 of FIG. 1) extracts images (e.g., images 152 of FIG. 1) from pods (e.g., pods 130 of FIG. 1) running within a cluster (e.g., cluster 140 of FIG. 1) of a network (e.g., network 110 of FIG. 1). In certain embodiments, one or more extracted images are used to create pods 130. Method 300 then moves from step 310 to step 315, where the network component determines which of the extracted images are unique. Unique images (e.g., unique images 154 of FIG. 1) are images within the extracted set of images that have no duplicates. Method 300 then moves from step 315 to step 320.

At step 320 of method 300, the network component scans the unique images in parallel. For example, the network component may use multiple scanner instances to scan the unique images simultaneously. Method 300 then moves from step 320 to step 325, where the network component searches for vulnerabilities (e.g., vulnerabilities 156 of FIG. 1) within the unique images. If the network component does not detect vulnerabilities within the unique images, method 300 advances from step 325 to step 360, where method 300 ends. If, at step 325, the network component detects one or more vulnerabilities within the unique images, method 300 moves from step 325 to step 330, where the network component assigns each vulnerability a vulnerability level (e.g., vulnerability level 158 of FIG. 1). The assigned vulnerability levels may include the following: critical, high, medium, and low. Method 300 then moves from step 330 to step 335.

At step 335 of method 300, the network component determines the highest vulnerability level of the assigned vulnerability levels. For example, the network component may detect 100 vulnerabilities within the unique images. Out of the 100 vulnerabilities, the network component may assign a "high" vulnerability level to 50 of the unique images, assign a "medium" vulnerability level to 30 of the unique images, and assign a "low" vulnerability level to 20 of the unique images. The network component determines that the "high" vulnerability level is the highest (most severe) vulnerability level from the assigned high, medium, and low vulnerability levels. Method 300 then moves from step 335 to step 340, where the network component assigns the highest vulnerability level (e.g., the "high" vulnerability level) to the pod. Method 300 then moves from step 340 to step 345.

At step 345 of method 300, the network component determines whether the highest vulnerability level exceeds a predetermined threshold. For example, the predetermined threshold may be set to the medium vulnerability level. If the highest vulnerability level is "high," then the highest vulnerability level exceeds the predetermined threshold set to the medium vulnerability level. If the highest vulnerability level is "medium," then the highest vulnerability level does not exceed the predetermined threshold set to the medium vulnerability level.

If, at step 345, the network component determines that the highest vulnerability level does not exceed the predetermined threshold, method 300 moves from step 345 to step 360, where method 300 ends. If, at step 345, the network component determines that the highest vulnerability exceeds the predetermined threshold, method 300 moves from step 345 to step 350, where the network component applies a policy (e.g., policy 160 of FIG. 1) to the pod. The policy may include killing the impacted pod, blocking the pod from running at a future point in time, preventing communication by the pod to specific destinations, and the like. Method 300 then moves from step 350 to step 360, where method 300 ends.

Although this disclosure describes and illustrates particular steps of the method of FIG. 3 as occurring in a particular order, this disclosure contemplates any suitable steps of the method of FIG. 3 occurring in any suitable order. For example, method 300 may include a step where the network component generates a scan report indicating information associated with the scan such as the vulnerability level of the pod. As another example, method 300 may include a step where the network component determines a location of the pod and/or identifies one or more images within the pod that contain the vulnerabilities. As still another example, method 300 may include a step where the network component identifies one or more components within each of the one or more images within the pod that contain the vulnerabilities. As yet another example, method 300 may include a step where the network component applies a different policy if, at step 345, the highest vulnerability level does not exceed the predetermined threshold but exceeds a different predetermined threshold.

Moreover, although this disclosure describes and illustrates an example method for scanning images for vulnerabilities including the particular steps of the method of FIG. 3, this disclosure contemplates any suitable method for scanning images for vulnerabilities including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
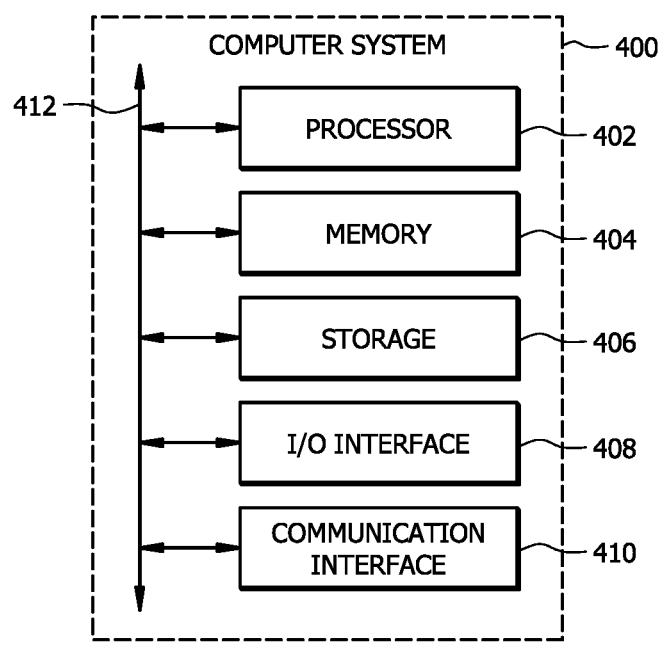
FIG. 4 illustrates an example computer system that may be used by the systems and methods described herein.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404.

Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A vulnerability scanning tool, comprising:
   one or more processors; and
   one or more computer-readable non-transitory storage media coupled to the one or more processors and comprising instructions that, when executed by the one or more processors, cause the vulnerability scanning tool to perform operations comprising:
   extracting a plurality of images from one or more pods running within a cluster;
   determining a plurality of unique, unduplicated images from the plurality of images;
   after determining the plurality of unique, unduplicated images from the plurality of images, scanning the plurality of unique, unduplicated images in parallel;
   detecting one or more vulnerabilities within the plurality of unique, unduplicated images in response to scanning the plurality of unique, unduplicated images in parallel;
   determining a vulnerability level associated with a pod of the one or more pods; and
   assigning the vulnerability level to the pod.

2. The vulnerability scanning tool of claim 1, the operations further comprising determining whether to apply a policy to the pod based at least in part on the vulnerability level of the pod, wherein the policy comprises one of the following:
   blocking the pod from running at a future point in time;
   killing the pod; and
   preventing communication by the pod to specific destinations within the cluster.

3. The vulnerability scanning tool of claim 1, wherein the vulnerability level is selected from one of the following vulnerability levels:
   critical;
   high;
   medium; and
   low.

4. The vulnerability scanning tool of claim 1, the operations further comprising:
   detecting a first vulnerability within a first unique, unduplicated image of the pod;
   classifying the first vulnerability within the first unique, unduplicated image of the pod as a high vulnerability level;
   detecting a second vulnerability within a second unique, unduplicated image of the pod;
   classifying the second vulnerability within the second unique, unduplicated image of the pod as a low vulnerability level; and
   assigning the high vulnerability level to the pod.

5. The vulnerability scanning tool of claim 1, the operations further comprising:
   determining a location of the pod;
   identifying one or more images within the pod that contains the one or more vulnerabilities; and
   identifying one or more components within each of the one or more images within the pod that contains the one or more vulnerabilities.

6. The vulnerability scanning tool of claim 1, wherein scanning the plurality of unique, unduplicated images in parallel is performed in runtime.

7. The vulnerability scanning tool of claim 1, the operations further comprising generating a scan report indicating the vulnerability level of the pod.

8. A method, comprising:
   extracting, by a vulnerability scanning tool, a plurality of images from one or more pods running within a cluster;
   determining, by the vulnerability scanning tool, a plurality of unique, unduplicated images from the plurality of images;
   after determining the plurality of unique, unduplicated images from the plurality of images, scanning, by the vulnerability scanning tool, the plurality of unique, unduplicated images in parallel;
   detecting, by the vulnerability scanning tool, one or more vulnerabilities within the plurality of unique, unduplicated images in response to scanning the plurality of unique, unduplicated images in parallel;
   determining, by the vulnerability scanning tool, a vulnerability level associated with a pod of the one or more pods; and
   assigning, by the vulnerability scanning tool, the vulnerability level to the pod.

9. The method of claim 8, further comprising determining, by the vulnerability scanning tool, whether to apply a policy to the pod based at least in part on the vulnerability level of the pod, wherein the policy comprises one of the following:
   blocking the pod from running at a future point in time;
   killing the pod; and
   preventing communication by the pod to specific destinations within the cluster.

10. The method of claim 8, wherein the vulnerability level is selected from one of the following vulnerability levels:

critical;
high;
medium; and
low.

11. The method of claim 8, further comprising:
detecting, by the vulnerability scanning tool, a first vulnerability within a first unique, unduplicated image of the pod;
classifying, by the vulnerability scanning tool, the first vulnerability within the first unique, unduplicated image of the pod as a high vulnerability level;
detecting, by the vulnerability scanning tool, a second vulnerability within a second unique, unduplicated image of the pod;
classifying, by the vulnerability scanning tool, the second vulnerability within the second unique, unduplicated image of the pod as a low vulnerability level; and
assigning, by the vulnerability scanning tool, the high vulnerability level to the pod.

12. The method of claim 8, further comprising:
determining, by the vulnerability scanning tool, a location of the pod;
identifying, by the vulnerability scanning tool, one or more images within the pod that contains the one or more vulnerabilities; and
identifying, by the vulnerability scanning tool, one or more components within each of the one or more images within the pod that contains the one or more vulnerabilities.

13. The method of claim 8, wherein scanning the plurality of unique, unduplicated images in parallel is performed in runtime.

14. The method of claim 8, further comprising generating, by the vulnerability scanning tool, a scan report indicating the vulnerability level of the pod.

15. One or more computer-readable non-transitory storage media embodying instructions that, when executed by a processor, cause the processor to perform operations comprising:
extracting a plurality of images from one or more pods running within a cluster;
determining, by the vulnerability scanning tool, a plurality of unique, unduplicated images from the plurality of images;
after determining the plurality of unique, unduplicated images from the plurality of images, scanning, by the vulnerability scanning tool, the plurality of unique, unduplicated images in parallel;
detecting one or more vulnerabilities within the plurality of unique, unduplicated images in response to scanning the plurality of unique, unduplicated images in parallel;
determining a vulnerability level associated with a pod of the one or more pods; and
assigning the vulnerability level to the pod.

16. The one or more computer-readable non-transitory storage media of claim 15, the operations further comprising determining whether to apply a policy to the pod based at least in part on the vulnerability level of the pod, wherein the policy comprises one of the following:
blocking the pod from running at a future point in time;
killing the pod; and
preventing communication by the pod to specific destinations within the cluster.

17. The one or more computer-readable non-transitory storage media of claim 15, wherein the vulnerability level is selected from one of the following vulnerability levels:
critical;
high;
medium; and
low.

18. The one or more computer-readable non-transitory storage media of claim 15, the operations further comprising:
detecting a first vulnerability within a first unique, unduplicated image of the pod;
classifying the first vulnerability within the first unique, unduplicated image of the pod as a high vulnerability level;
detecting a second vulnerability within a second unique, unduplicated image of the pod;
classifying the second vulnerability within the second unique, unduplicated image of the pod as a low vulnerability level; and
assigning the high vulnerability level to the pod.

19. The one or more computer-readable non-transitory storage media of claim 15, the operations further comprising:
determining a location of the pod;
identifying one or more images within the pod that contains the one or more vulnerabilities; and
identifying one or more components within each of the one or more images within the pod that contains the one or more vulnerabilities.

20. The one or more computer-readable non-transitory storage media of claim 15, wherein scanning the plurality of unique, unduplicated images in parallel is performed in runtime.

* * * * *